United States Patent
Platzer et al.

(10) Patent No.: US 9,049,296 B2
(45) Date of Patent: Jun. 2, 2015

(54) SYSTEM AND METHOD FOR DISTRIBUTING AUTO-ATTENDANT ACROSS USER ENDPOINTS

(75) Inventors: David Bruce Platzer, Garden Ridge, TX (US); Eric K. Weeren, Garland, TX (US)

(73) Assignee: Cisco Technology, Inc., San Jose, CA (US)

(*) Notice: Subject to any disclaimer, the term of this patent is extended or adjusted under 35 U.S.C. 154(b) by 2581 days.

(21) Appl. No.: 11/551,799

(22) Filed: Oct. 23, 2006

(65) Prior Publication Data

US 2008/0095352 A1   Apr. 24, 2008

(51) Int. Cl.
*H04M 7/00* (2006.01)
*H04M 3/00* (2006.01)
*H04M 3/51* (2006.01)
*H04M 3/42* (2006.01)
*H04M 3/533* (2006.01)

(52) U.S. Cl.
CPC ............ *H04M 3/51* (2013.01); *H04M 3/42374* (2013.01); *H04M 3/53325* (2013.01)

(58) Field of Classification Search
USPC ...................................... 379/265.02–266.04
See application file for complete search history.

(56) References Cited

U.S. PATENT DOCUMENTS

| | | | | |
|---|---|---|---|---|
| 4,953,204 A | * | 8/1990 | Cuschleg et al. | 379/266.05 |
| 5,946,386 A | * | 8/1999 | Rogers et al. | 379/265.09 |
| 6,442,242 B1 | * | 8/2002 | McAllister et al. | 379/67.1 |
| 6,650,748 B1 | * | 11/2003 | Edwards et al. | 379/266.04 |
| 7,620,170 B2 | * | 11/2009 | Turcan et al. | 379/265.02 |
| 7,970,117 B2 | * | 6/2011 | Shaffer et al. | 379/265.01 |
| 2002/0001302 A1 | * | 1/2002 | Pickett | 370/352 |
| 2003/0008682 A1 | * | 1/2003 | Emerson, III | 455/557 |
| 2004/0001579 A1 | * | 1/2004 | Feinberg et al. | 379/156 |
| 2005/0094799 A1 | * | 5/2005 | Elsey | 379/266.04 |
| 2006/0072726 A1 | * | 4/2006 | Klein et al. | 379/201.01 |

* cited by examiner

*Primary Examiner* — Joseph T Phan
(74) *Attorney, Agent, or Firm* — Patterson + Sheridan, LLP (57) ABSTRACT

Embodiments of the present invention generally provide techniques and apparatus that may be used to distribute services in a telephone system. Utilizing these techniques, functions conventionally centralized and requiring a separate server may be distributed to end units, for example, as instances of such applications running on network telephones. Examples of such functions include, but are not limited to, auto attendant functions, distributed voice mail functions, and operator functions.

16 Claims, 10 Drawing Sheets

SYSTEM AND METHOD FOR DISTRIBUTING AUTO-ATTENDANT ACROSS USER ENDPOINTS

BACKGROUND OF THE INVENTION

1. Field of the Invention

Embodiments of the present invention generally relate to network-based phone systems. More particularly, embodiments of the present invention relate to distributing functions that are conventionally centralized and require separate hardware servers, such as auto-attendant services, to user endpoints.

2. Description of the Related Art

Voice over Internet Protocol (VoIP) technology has evolved to the point that network telephone systems can provide feature-rich services that rival or surpass those provided by conventional (analog) telephone systems. Examples of such features include call forwarding, voicemail and auto-attendant services (e.g., where a voice leads a caller through a set of menus via voice or touch-tone commands).

Figure 1:
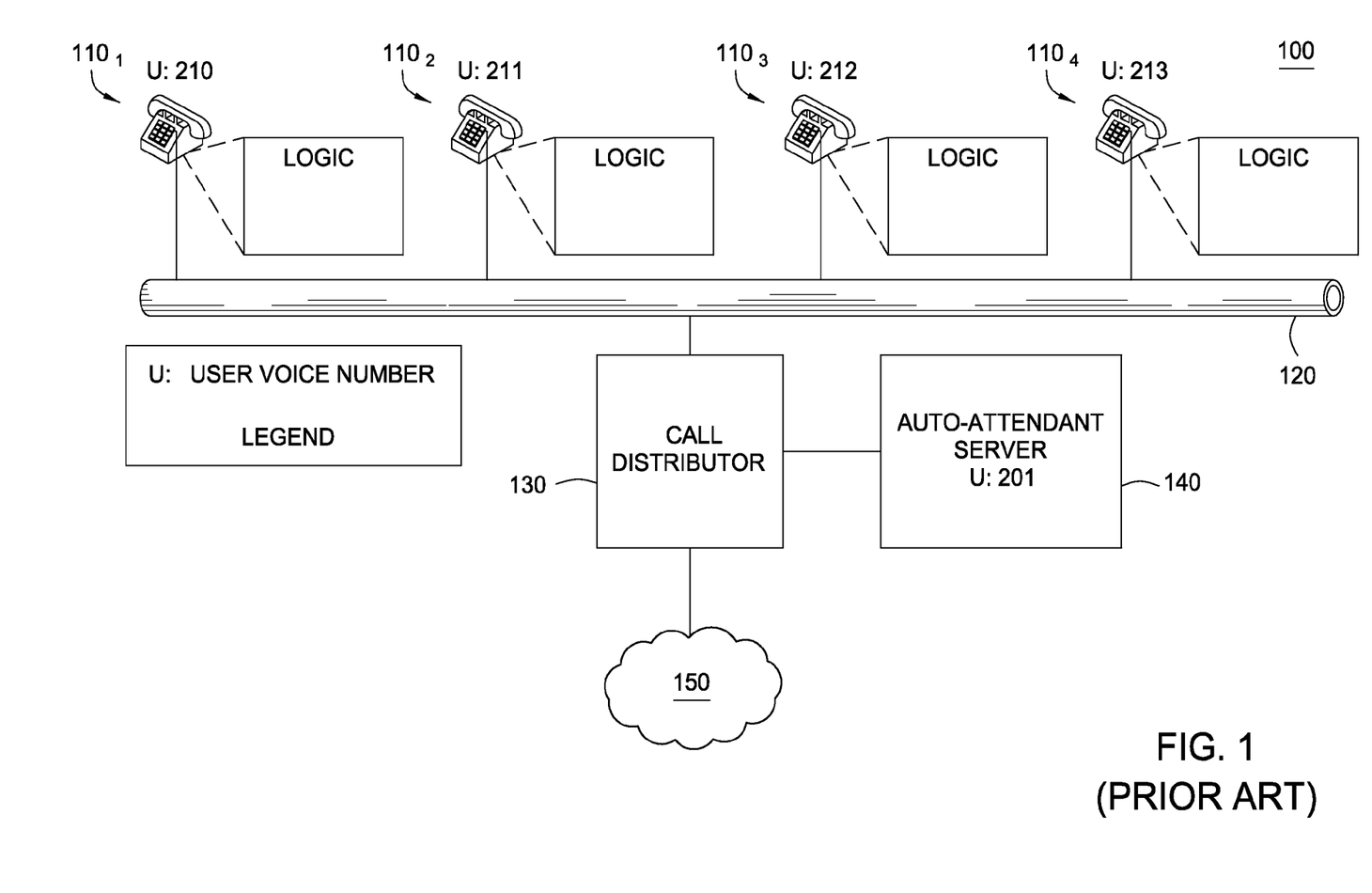
FIG. 1 illustrates an example of a telephone system with centralized auto-attendant functionality in accordance with the prior art.

FIG. 1 illustrates an example of a network telephone system 100 that provides conventional centralized auto-attendant services. As illustrated, the system 100 includes a series of end units $110_1$-$110_4$ (collectively end units 110), such as telephones, connected to a network hub 120. Calls received via an interface 150, which may be any combination of a wide area network (WAN) and/or circuit switched network, are routed to the end units 110 by a call distributor 130.

The call distributor 130 may maintain a list of ID numbers (or routing table) associated with the different end units 110 that allows the call distributor to route incoming calls to their targeted end units. In the illustrated example, each of the end units $110_1$-$110_4$ has an associated user voice ID #210-213, respectively, which may each correspond to a phone number in the routing table. Thus, when a call comes in for a dialed phone number corresponding to ID#210, the call distributor 130 may route this call to end unit $110_1$. The call distributor 130 may implement other routing features, such as call forwarding and voicemail, in the event an end unit targeted by a call is unavailable (busy or unregistered/unplugged).

The call distributor 130 may also be configured to route auto-attendant calls (identified by the dialed number) for proper handling. Typically, auto-attendant calls are received on the same number and, as illustrated in FIG. 1, are handled by a single separate server 140. This centralized approach has a number of disadvantages. One disadvantage is that an additional server 140 for the auto-attendant service increases system cost and complexity. Another disadvantage is a lack of redundancy. If the server 140 (or auto-attendant application running on the server 140) goes down for any reason, or the server 140 becomes too busy with calls, auto-attendant functionality is lost.

Therefore, there is a need for an improved approach to providing functions to network telephone systems such as an auto-attendant, for example, that does not require a separate server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide techniques and apparatus that may be used to distribute services in a telephone system. Utilizing these techniques, functions conventionally centralized and run on a separate server may be distributed to end units, for example, as instances of such applications running on network telephones. By distributing these functions, overall system cost and complexity may be reduced by eliminating the need for a separate server. Further, because the functions may be distributed to multiple end units, a level of redundancy may also be achieved. For example, in the event one end unit fails, distributed functions may still be provided by another end unit, resulting in increased network reliability.

Aspects of the present invention may be embodied in executable software resident in VoIP end units (e.g., as distributed instances of an auto-attendant) and/or network interface devices such as a gateway and/or router (e.g., to distribute calls to distributed instances of an auto-attendant). To facilitate understanding, the following description will refer to distributing auto-attendant functionality to end units of a network telephone system as an example of a system in which embodiments of the present invention may be used to advantage. However, those skilled in the art will recognize that embodiments of the present invention may be applied in other ways, for example, to distribute other types of functionality, such as system voicemail, operator functions and the like.

An Example of a System with Distributed Auto-Attendant

Figure 2:
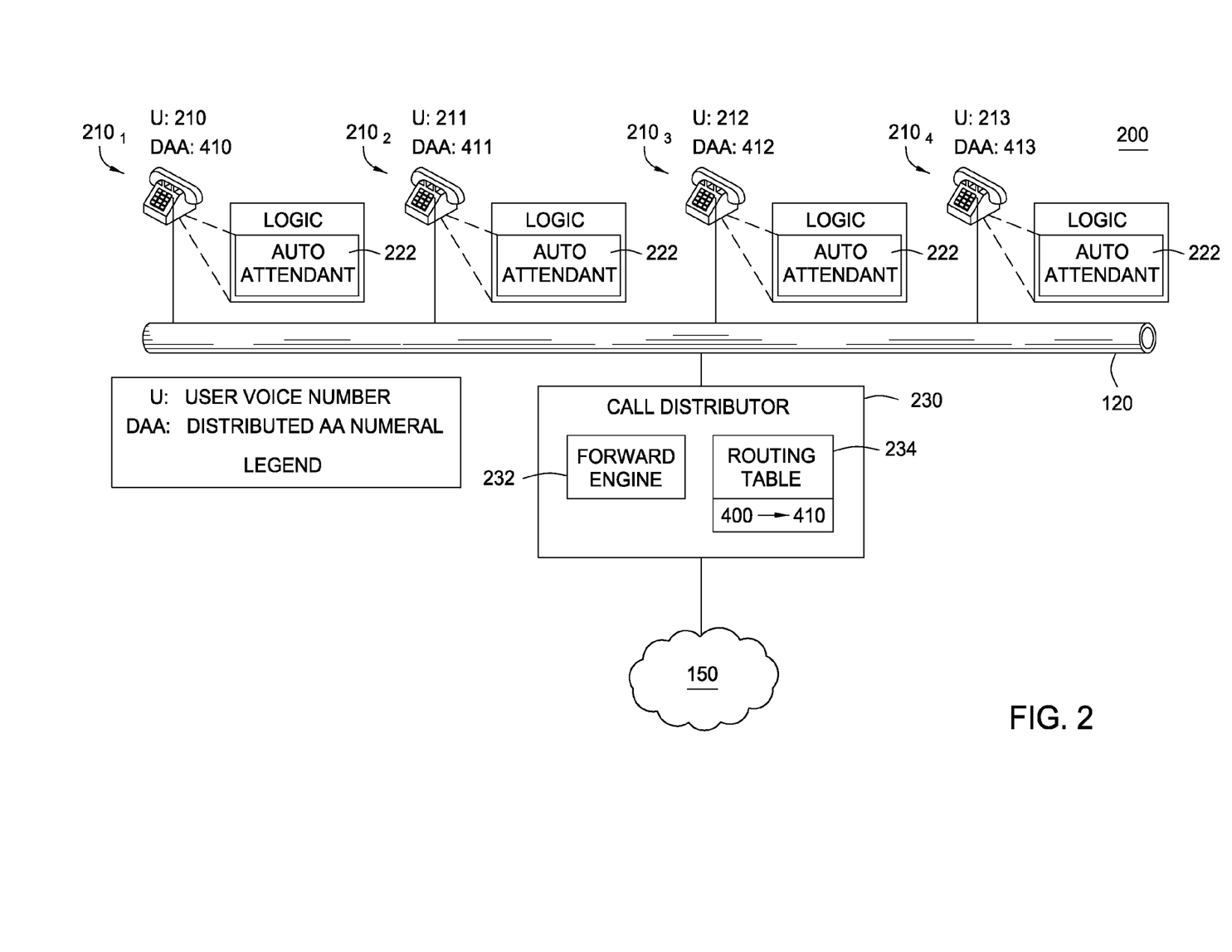
FIG. 2 illustrates an example of a telephone system with distributed auto-attendant functionality in accordance with one embodiment of the present invention.

FIG. 2 illustrates an example of a telephone system 200 with distributed auto-attendant functionality in accordance with one embodiment of the present invention. Rather than utilize a separate server (as illustrated in FIG. 1) to centralize auto-attendant functionality, instances of auto-attendant applications 222 (hereinafter, an AA instance) may be distributed and run on end units 210. While four end units 210₁-210₄ are shown as an example, any number of end units may be supported, with all or only a limited subset of end units actually running an AA instance 222.

For some embodiments, one or more of the end units may be telephones, as shown. For some embodiments, one or more of the end units may be some other type of processing unit capable of providing functionality as described herein, such as a "dumb terminal."

Figure 3:
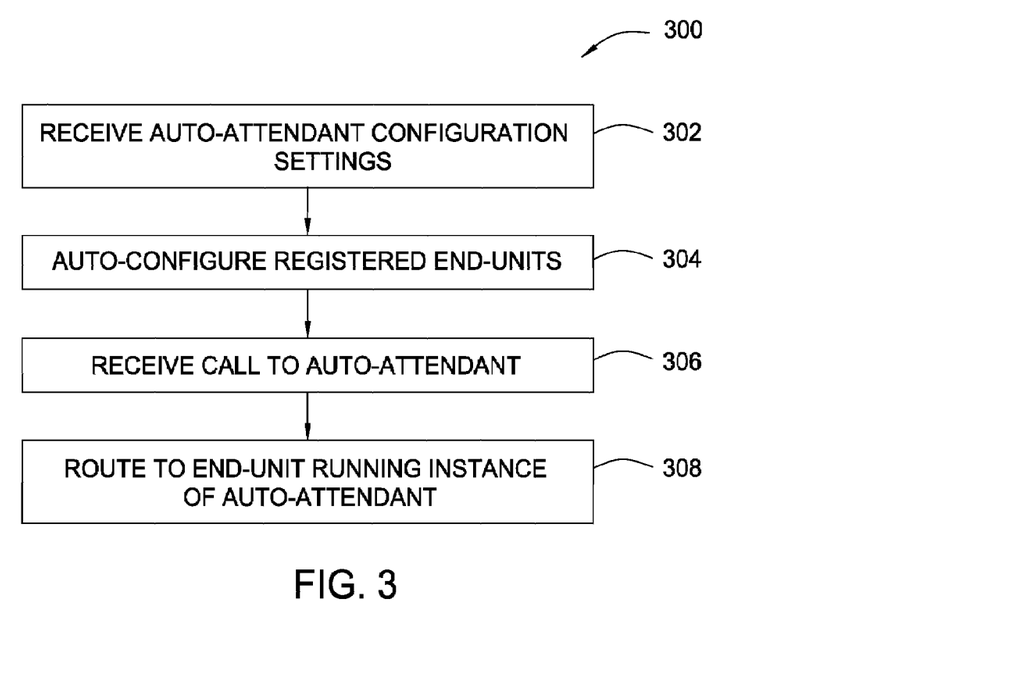
FIG. 3 is a flow diagram of example operations for implementing distributed auto-attendant functionality, in accordance with embodiments of the present invention.

Operation of the components shown in FIG. 2 may be described with reference to FIG. 3, which illustrates a flow diagram of example operations 300 that may be performed to implement distributed auto-attendant functionality. It should be understood that the operations 300 may be performed by components other than those shown in FIG. 2 and that the components may be capable of performing other operations than those shown in FIG. 3.

The operations 300 start, at step 302, by receiving auto-attendant configuration settings and, at step 304, end units are automatically configured. The auto-attendant configuration settings may be entered by an administrator, for example, via a graphical user interface (GUI). The configuration settings may include the designation of a dialed number for auto-attendant calls, as well as an ID# to associate with the dialed number, or simply designation of an ID# if dialed numbers have already been associated with ID#s.

In the following examples, an ID# of 400 is assumed as being designated for auto-attendant calls. In response to receiving an auto-attendant call (identified by an ID# of 400), the call distributor 230 may examine a routing table 234 to find an end unit to which the auto-attendant call should be routed. In FIG. 2, the routing table 234 indicates auto attendant calls (ID#0 400) should be routed to an end unit registered with the DAA#410, which is end unit 210 in this example.

For some embodiments, as part of an auto-configuration process, a set of distributed auto-attendant (DAA) ID#s (410-413 are shown) may be automatically assigned to end units 210₁-210₄, which may be configured to handle calls they receive with these ID#s with their AA instance 222. In some cases, after configuration, end units 210₁-210₄ may register with the call distributor 230, allowing the call distributor to know what DAA #s are available for handling AA calls.

Once configuration is complete, auto-attendant calls may be received, at step 306, and routed to end units running AA instances, at step 308. The call distributor 230 may maintain a routing table 234 with a list of ID#s associated with the different end units 210₁-210₄ that allows the call distributor to route incoming calls to their targeted end units. The call distributor 230 may obtain a list of end units in a number of different ways (e.g., end units may register, there may be a GUI for defining which end points, or some type of central configuration that chooses certain end units based on other information, such as available processing resources). In addition to user voice ID#s 210-213, each end unit may also have other corresponding numbers for distributed functions, such as a distributed auto-attendant (DAA) ID#. Illustratively, DAA#s 410-413 are assigned to end units 210₁-210₄, respectively. When an auto-attendant call is received (identified by call ID#400), the call distributor 230 may determine a DAA# from the routing table 234 and route the call to a corresponding end unit assigned that DAA#.

Figure 4:
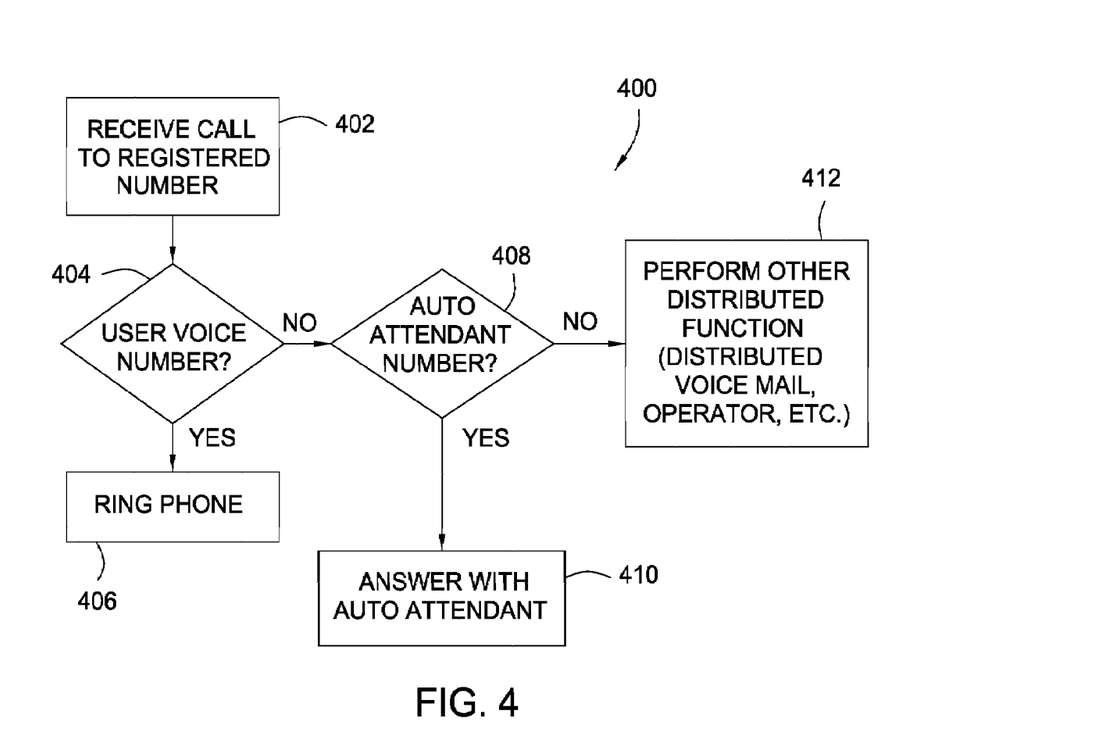
FIG. 4 is a flow diagram of example operations for implementing distributed auto-attendant functionality at an end unit, in accordance with embodiments of the present invention.

FIG. 4 is a flow diagram of example operations 400 that may be performed, for example, at the end units, in accordance with embodiments of the present invention. For example, the operations 400 may be performed by software (executable instructions) running on the end unit. The operations 400 begin, at step 402, by receiving a call (routed by the call distributor) targeting a number registered to the end unit.

At step 404, a determination is made as to whether the call targets a user voice number registered to the end unit (e.g., ID#s 210-213 for the end units 210₁-210₄ shown in FIG. 2). If the call does target a user voice number, the end unit registered with the targeted user voice number may ring the phone (or provide some other external indication of the call), at step 406.

If the call does not target a user voice number, a determination is made as to whether the call is an auto-attendant call, for example, by determining if the call targets a DAA# registered to the end unit (e.g., DAA#s 410-413 for the end units 210₁-210₄ shown in FIG. 2), at step 404. If the call is an auto-attendant call, the call is answered with the auto-attendant (i.e., the instance of auto-attendant running on the end unit), at step 410. If the call is not a normal (user voice) call or an auto-attendant call, as will be described in greater detail below, the call may be associated with some other distributed function (e.g., distributed system voice mail or an operator function), which may be performed at step 412.

Figure 5A:
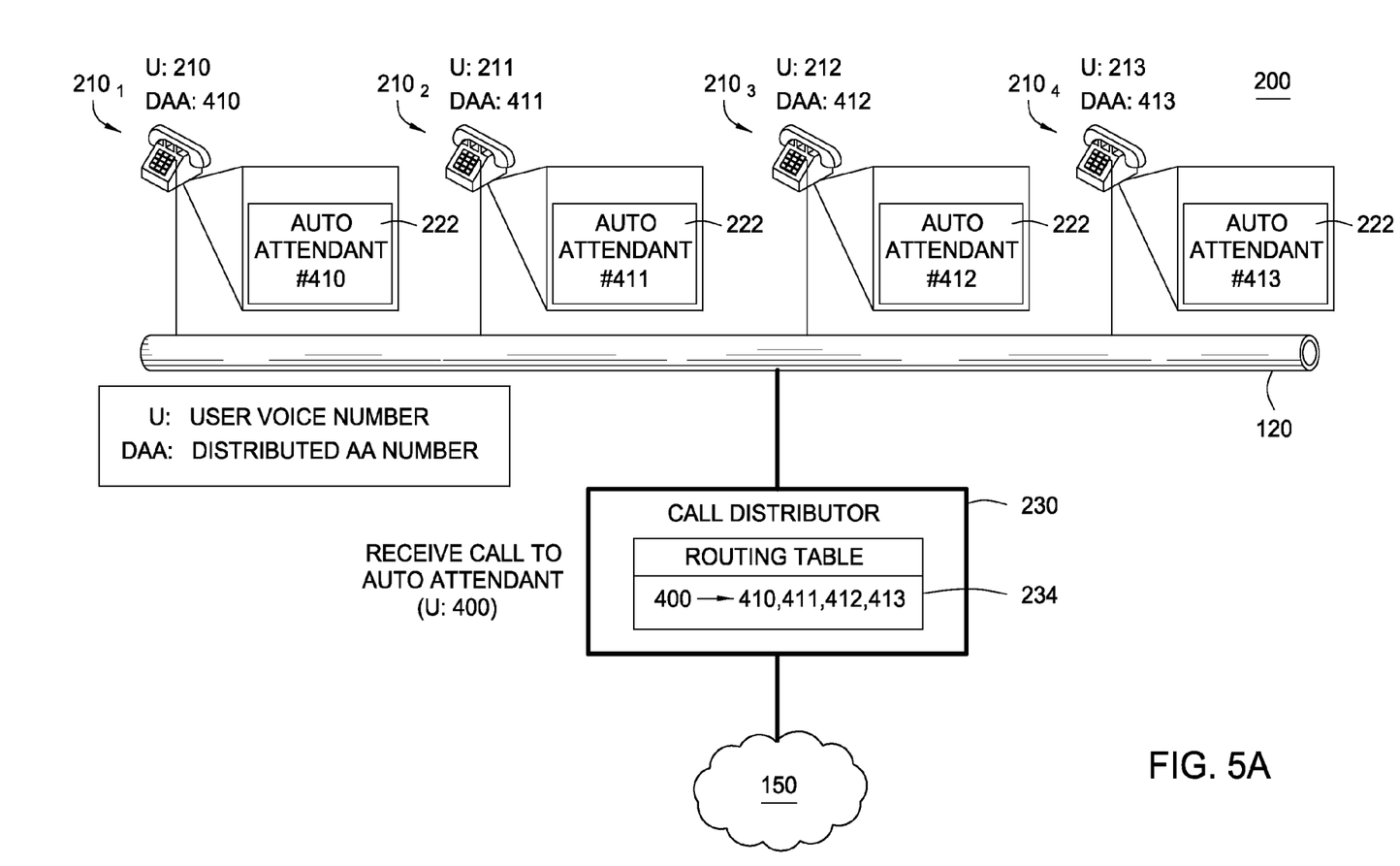
FIGS. 5A and 5B illustrate routing an auto-attendant call to an end unit running an instance of an auto-attendant, in accordance with one embodiment of the present invention.
Figure 5B:
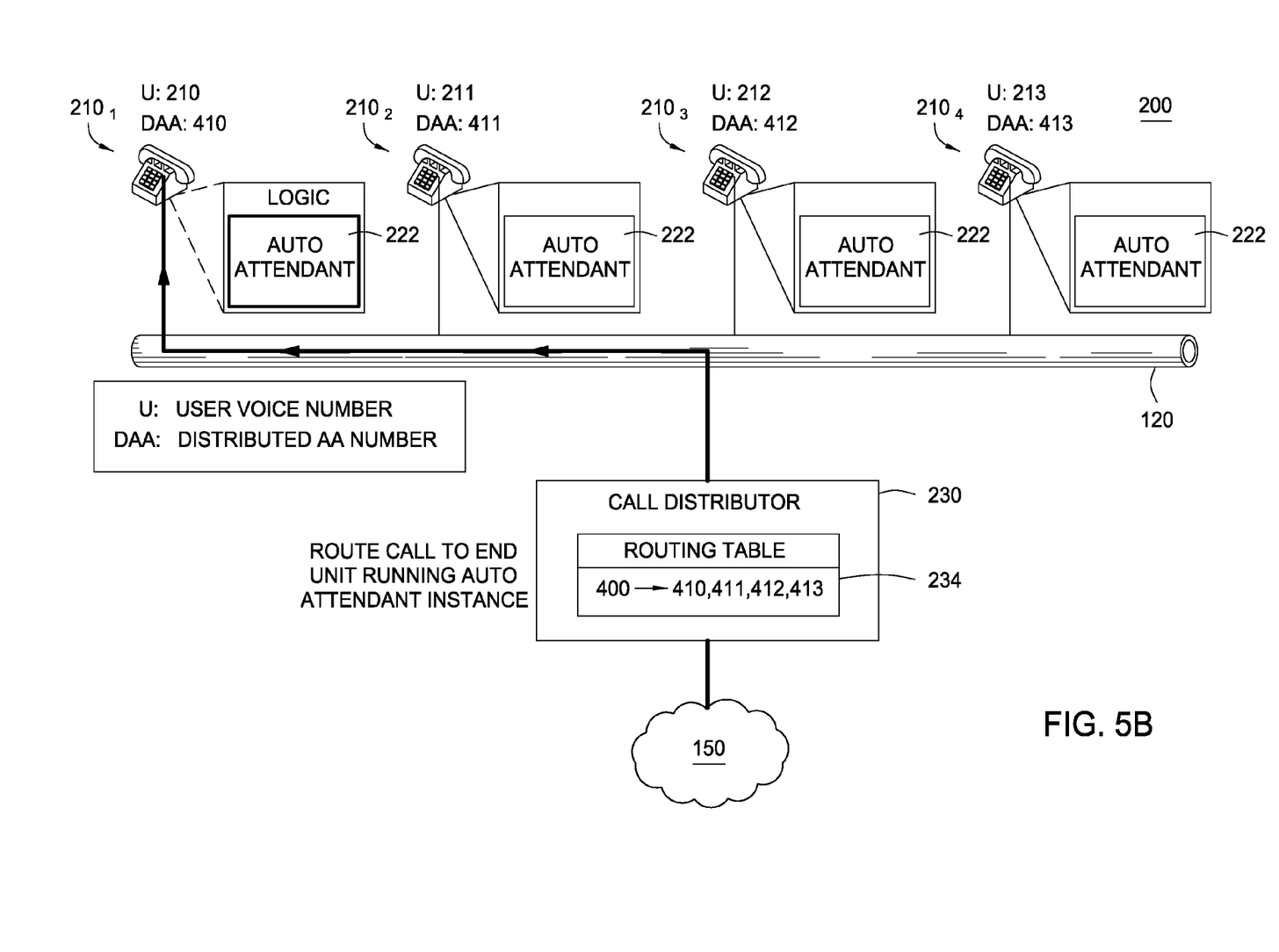

FIGS. 5A and 5B illustrate the handling and routing of an auto-attendant call to an end unit running an instance of an auto-attendant, in accordance with one embodiment of the present invention. Again, the example assumes an ID# of 400 has been designated for auto-attendant calls. In FIG. 5A, an auto-attendant call comes into the call distributor 230. In response, the call distributor 230 may examine the routing table 234 and find that calls to ID#400 should be routed to an end unit registered with the DAA#410, end unit 210 in this example. Thus, the auto-attendant call is routed to end unit 210, as shown in FIG. 5B.

As will be described in greater detail below, depending on the embodiment, the call distributor may simply pick the same DAA# every time and route the call to the corresponding end unit or select from a list of different DAA#s utilizing some type of algorithm (e.g., in an effort to evenly distribute auto-attendant calls). In some cases, the call distributor 230 may route an AA call to an end unit that is not available for some reason, for example, that end unit may be busy handling other calls, unregistered, unplugged, and/or the AA instance may not running/enabled. In such cases, the AA call may be forwarded to another end unit based on settings in a forwarding engine.

Figure 6A:
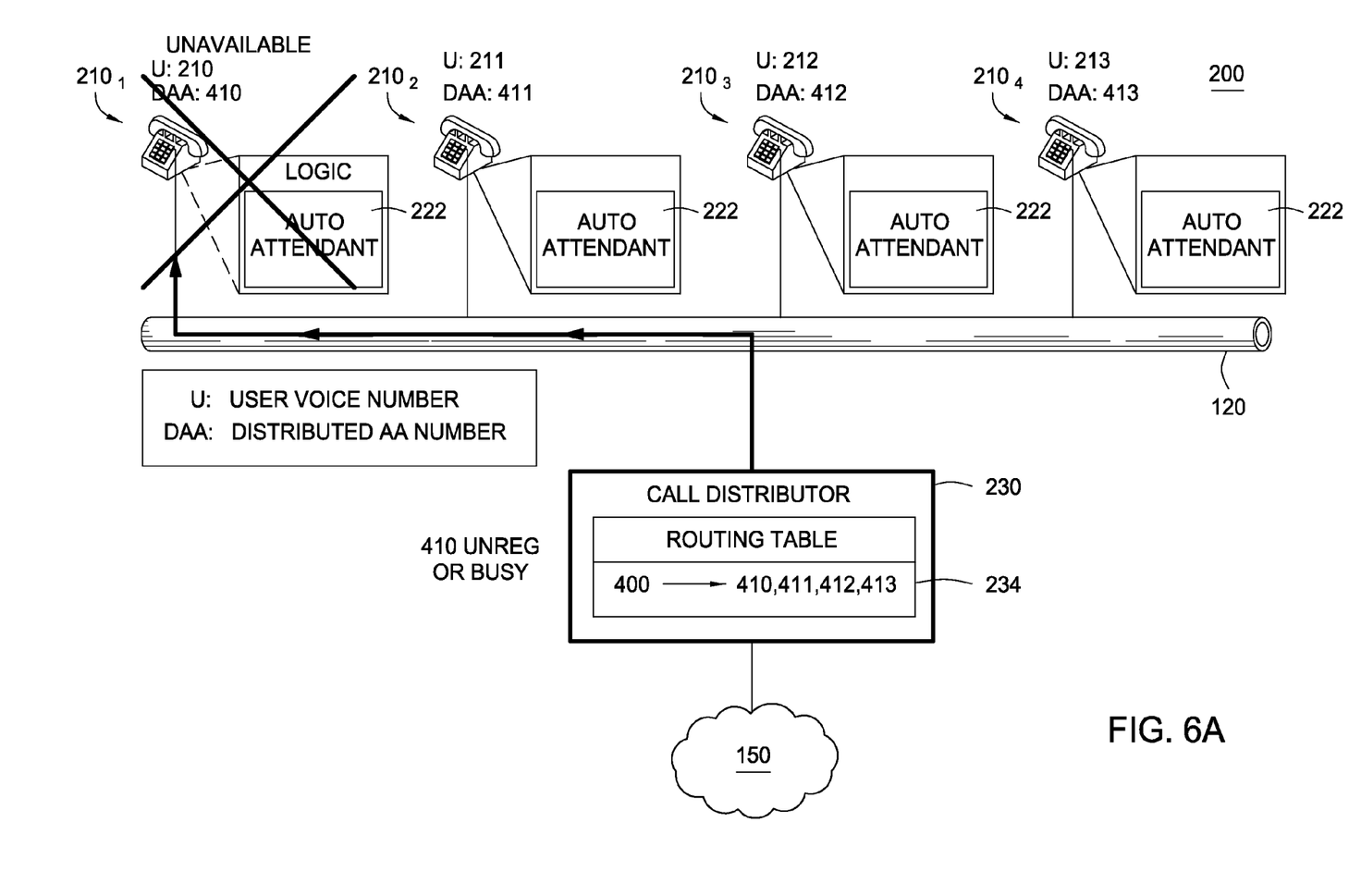
FIGS. 6A and 6B illustrate forwarding an auto-attendant call to an end unit running an instance of an auto-attendant, in accordance with one embodiment of the present invention.

FIGS. 6A and 6B illustrate forwarding an auto-attendant call to an end unit running an instance of an auto-attendant, in accordance with one embodiment of the present invention. In FIG. 6A, an auto-attendant call comes into the call distributor 230. As in the example above, the call distributor 230 may examine the routing table 234 and find that calls to 400 should be routed to an end unit registered with the DAA#410, end unit 210₁. In this example, however, end unit 210₁ is unavailable (e.g., busy handling other calls, unhooked, and/or unregistered).

Figure 6B:
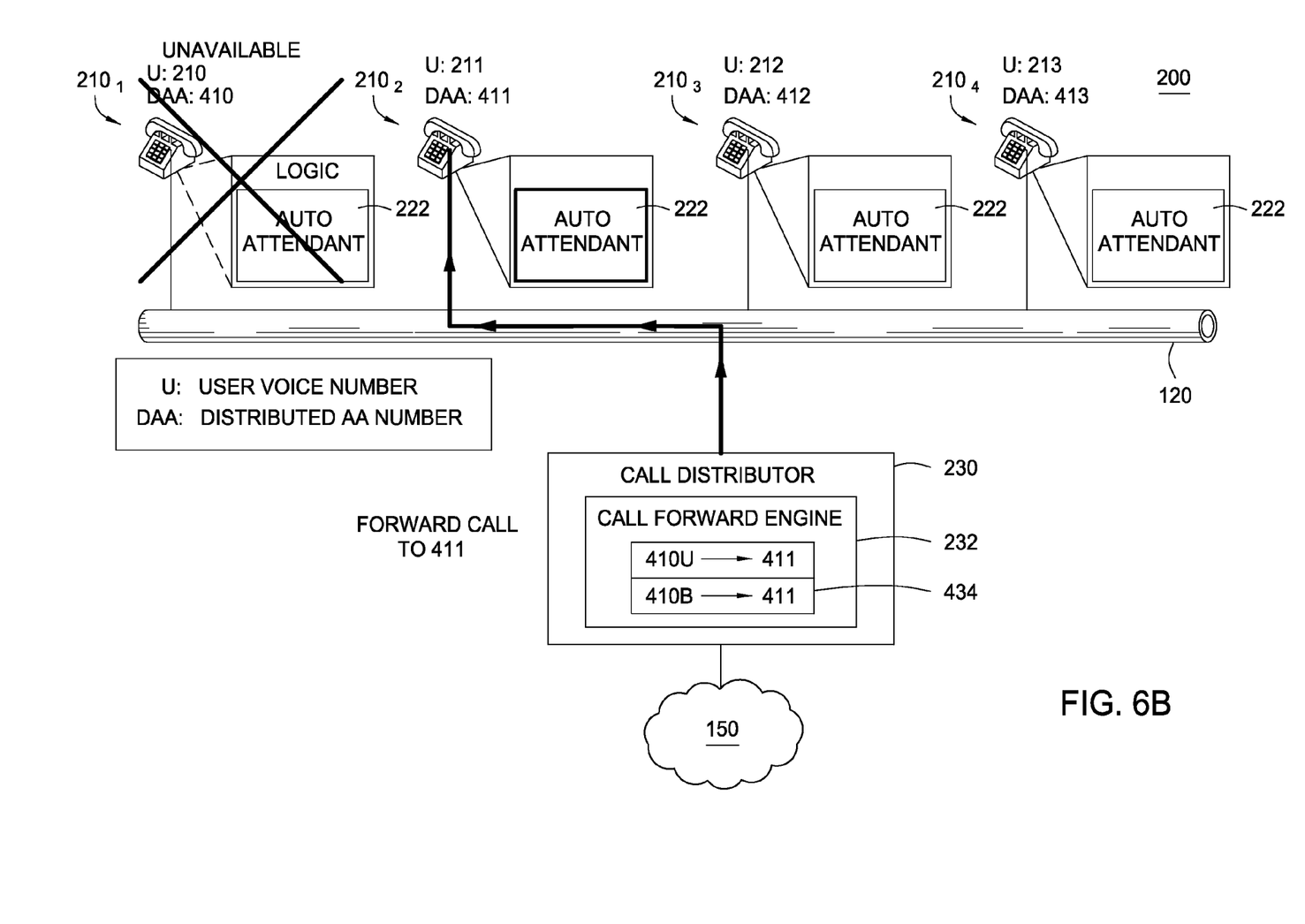

Upon detecting the end unit registered to DAA#410 is unavailable, the call forward engine 232 may determine an end unit designated to receive calls routed thereto. As illustrated, the call forward engine 232 may include a call forward routing table 434 that indicates end units to which a call should be routed when an end unit targeted by the call is unavailable. In this example, the call forward engine indicates that, in the event an end unit registered to DAA#410 is unregistered (410U) or busy (410B), calls should be forwarded to an end unit registered to DAA#411 (end unit 210₂ in this example). Thus, as illustrated in FIG. 6B, the AA call is forwarded to end unit 210₂.

Routing auto-attendant calls using a routing table and call forwarding as described thus far may provide advantages, for example, in that existing routing and call forwarding techniques may be used, allowing efficient reuse of existing code for such features. In other words, the call distributor 230 need not realize the calls being routed or forwarded are actually auto-attendant calls, but merely looks up routing information from the routing tables 234 and 434. In this scenario, only the end units $210_1$-$210_4$ need to be aware the calls are auto-attendant calls so they can answer with their instances of auto-attendant 222.

Alternative Routing Algorithms

However, simple forwarding may face performance issues in the event that multiple end units in the "forward chain" are unavailable. As an example, assume end units $210_1$, $210_2$, and $210_3$ were all unavailable, but end unit $210_4$ is available, and the call forward routing table 434 specified a forward chain of DAA#410-DAA#411-DAA#412-DAA#413. In this example, there may be noticeable delays in answering with the auto-attendant instance 222 on end unit $210_4$, as the auto-attendant call is forwarded from end unit to end unit. Obviously, this delay may grow proportionally with a larger number of units in a forward chain.

Figure 7:
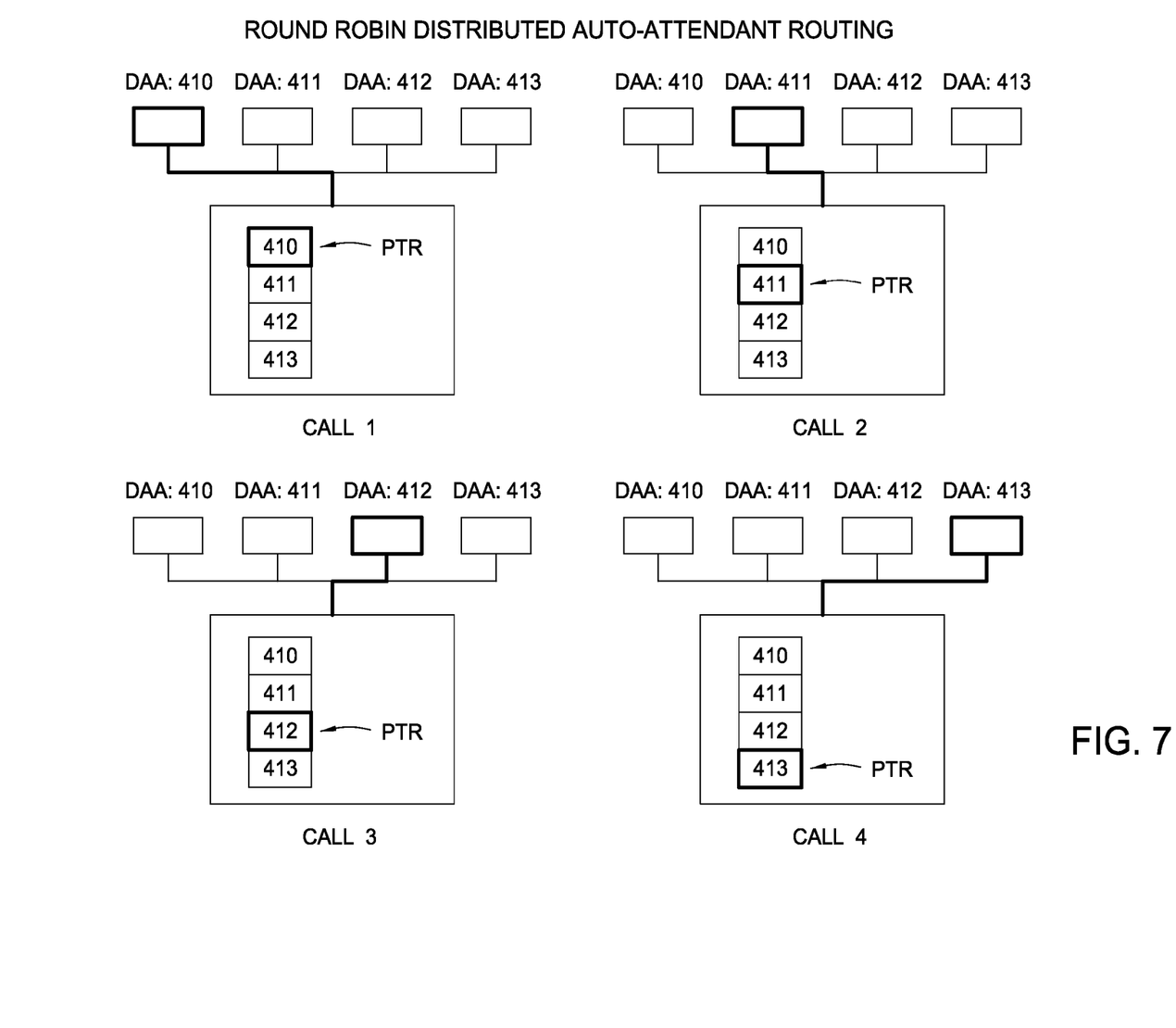
FIG. 7 illustrates an example of a round robin routing algorithm in accordance with one embodiment of the present invention.

Therefore, for some embodiments, alternate routing algorithms may be implemented, for example, in an effort to more efficiently route auto-attendant calls and balance auto-attendant calls between end units 210. For example, FIG. 7 illustrates an example of a "round robin" routing algorithm in accordance with one embodiment of the present invention.

In the illustrated example, the call distributor 230 may alternate between end units when routing auto-attendant calls, cycling through each end unit once before repeating. As illustrated in FIG. 7, the call distributor 230 may maintain a pointer to the next DAA# to receive an auto-attendant call and may route the next auto-attendant call to the corresponding end unit. A first call (CALL 1) may be routed to end unit $210_1$ (DAA#410), after which the pointer may be incremented to point to DAA#411 so the next call (CALL2) may be routed to end unit $210_2$. After a call has been routed to end unit corresponding to the last DAA# in the list (DAA#413 for end unit $210_4$), the pointer may return to point to the first DAA# (410).

Other algorithms may also attempt to evenly distribute call workload to end units and, for some embodiments, may maintain some type of history for each end unit. For example, a call distributor may maintain a log of end units that were recently unavailable and attempt to route calls to other end units first. In addition to historical data, current information obtained in real time about the current status/workload of each endpoint may also be used in such algorithms.

Alternative Distributed Functionality

Auto-attendant is just one example of the types of functions that may be distributed to end units, in accordance with embodiments of the present invention. Examples of other types of functions include, but are not limited to a "roaming" operator function, a distributed system voice mail function, and a media serving function (e.g., allowing pre-recorded audio to be accessed via telephone). For some embodiments, such functions may be provided instead of, or in addition to, the auto-attendant functions described above.

In a roaming operator function, calls targeting an operator may be routed to end units of various individuals within an organization for handling. Such a feature may be particularly useful in relatively small organizations that might not need to hire a full time operator. The techniques described above for routing auto-attendant calls may also be used to route operator calls to different end units (e.g., of different people capable of answering a phone politely and properly handling a call). For some embodiments, employees may have an option of not taking operator calls (e.g., by a phone setting/button), in which case the forwarding techniques described above may be used to route the operator call to a different end unit.

A distributed system voice mail (DSVM) function, may allow groups of people (members) to share and access common messages. Such a system may be useful, for example, in a setting where a department services a number of calls, such as a customer service department or a help desk of an information technology (IT) department. Any members of such a department may be able to handle calls and respond accordingly and, thus, may be notified of, and given access to, messages.

Figure 8A:
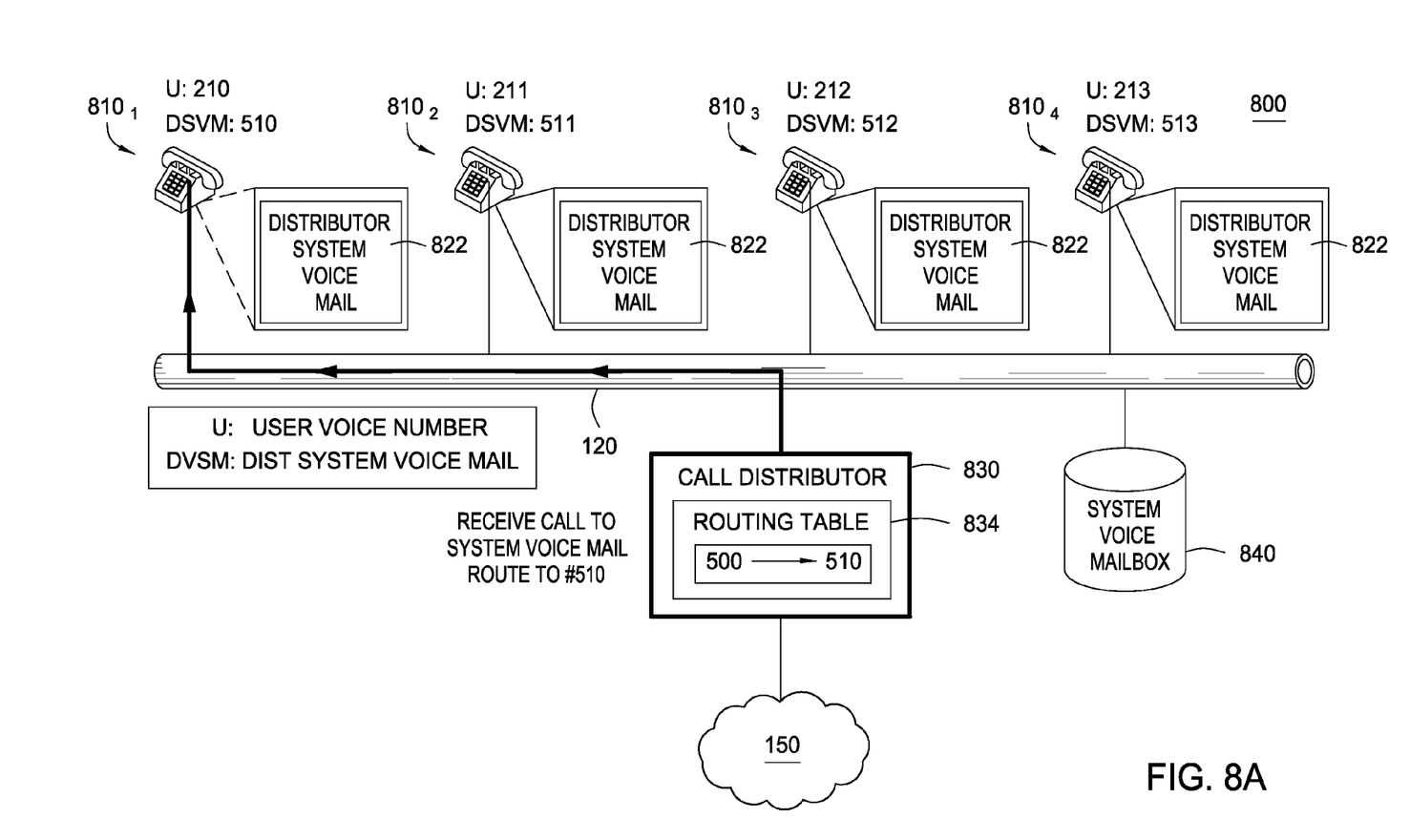
FIGS. 8A and 8B illustrate routing a system voice mail call to an end unit running an instance of a distributed system voice mail service, in accordance with one embodiment of the present invention.
Figure 8B:
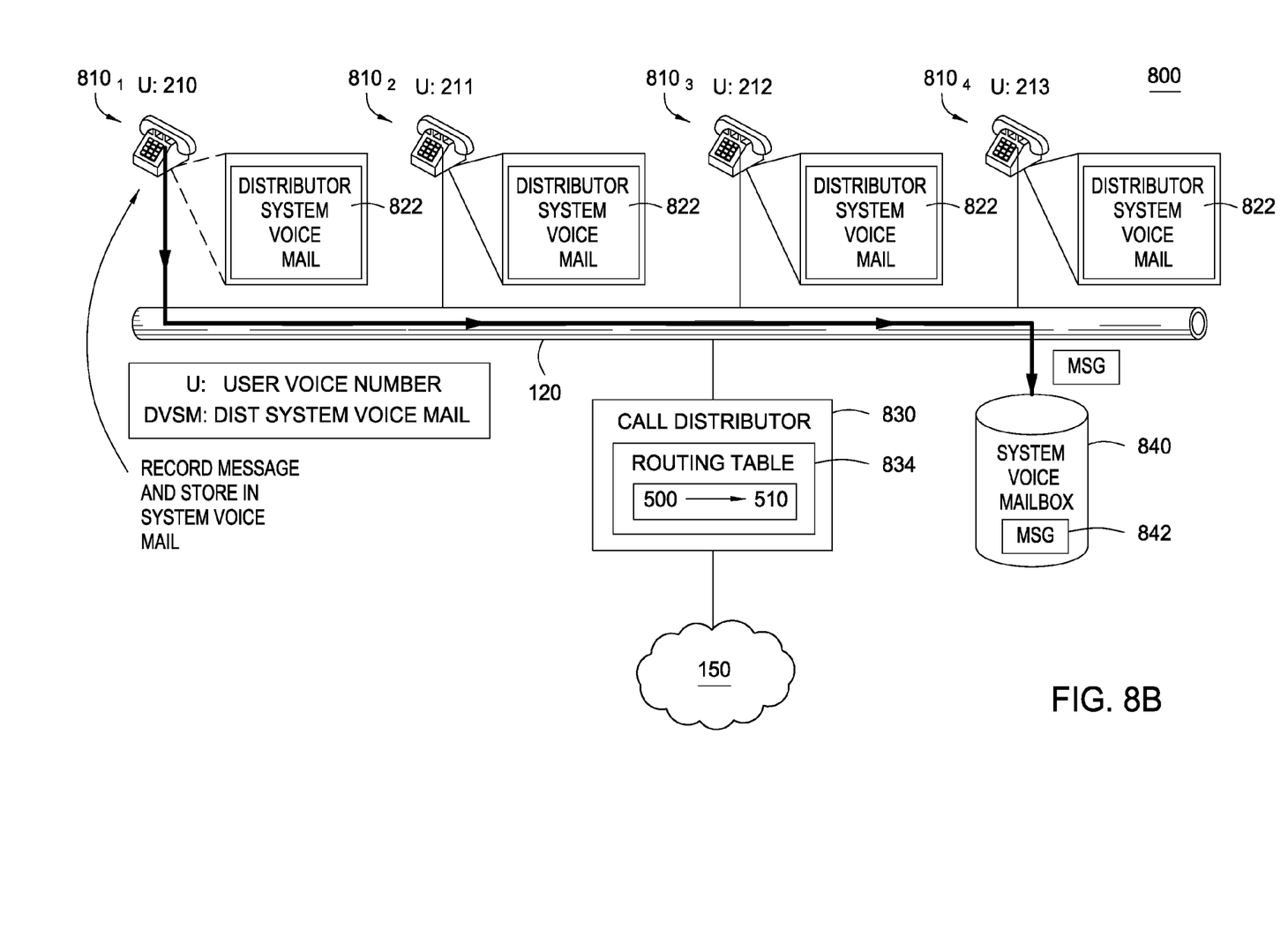

FIGS. 8A and 8B illustrate an example of a routing of a system voice mail call to an end unit running an instance of a distributed system voice mail service, in accordance with one embodiment of the present invention. As illustrated, DSVM functionality may be distributed as instances of DSVM applications 822 running on multiple end units ($810_1$-$810_4$).

A DSVM call comes in to a call distributor 830, which may have a routing table 834 indicating how DSVM calls (identified by DSVM#500 in this example), should be routed. The routing table 834 indicates DSVM calls should be routed to an end unit registered with DSVM#510, end unit $810_1$ in this example. Thus, the call may be routed to end unit $810_1$, which handles the call with an instance of a DSVM application 822. The DSVM application 822 may record a voice mail message 842, which may be stored in a central storage location, such as a system voice mailbox 840. The system voice mailbox 840 may be accessible, for example, to all members in a defined group allowing any member to retrieve the message 842.

Conclusion

Distributing functionality (e.g., an auto-attendant feature, distributed voice mail and/or roaming operator) in a network telephone system may reduce overall system cost and complexity by eliminating the need for a separate server. In addition, by distributing the functionality to multiple end units, a degree of redundancy may be achieved, with a possible corresponding increase in system reliability.

While the foregoing is directed to embodiments of the present invention, other and further embodiments of the invention may be devised without departing from the basic scope thereof, and the scope thereof is determined by the claims that follow.

What is claimed is:

1. A method for distributing auto-attendant functionality in a networked phone system including a plurality of end units, comprising:
   receiving, by a call distributer application executing on a node in the networked phone system, a call specifying a target in the networked phone system;
   identifying, by the call distributer application, a routing table entry specifying a first end unit of the plurality of end units as being associated with the target, wherein each of the plurality of end units comprises a networked telephone executing an instance of a distributed auto-attendant call system; and
   routing the call to the first end unit, wherein the instance of the distributed auto-attendant call system executing on the first end unit is configured to: (1) issue an external indication of the call via the first end unit upon determining that the target is a user number, and (2) handle the call without issuing an external indication of the call upon determining that the target is not a user number.

2. The method of claim 1, the method further comprising: forwarding the call to a second end unit of the plurality of end units executing an instance of the distributed auto-attendant call system auto-attendant call in response to determining the first end unit is unavailable.

3. A method for distributing functionality in a networked phone system, comprising:
deploying instances of applications capable of performing the functionality on a plurality of networked telephones of the networked phone system;
receiving, by a call distributer application executing on a node in the networked phone system, a call targeting the functionality;
identifying, by the call distributer application, a routing table entry specifying a first end unit of the plurality of end units as being providing the functionality, wherein each of the plurality of end units comprises a networked telephone executing an instance of a distributed auto-attendant call system; and
routing, by the call distributer application, the call to the first end unit, wherein the instance of the distributed auto-attendant call system executing on the first end unit is configured to: (1) issue an external indication of the call via the first end unit upon determining that the target is a user number, and (2) handle the call without issuing an external indication of the call upon determining that the target is not a user number.

4. The method of claim 3, wherein the functionality comprises system voice mail functionality.

5. The method of claim 4, wherein the first end unit is configured to answer the call, record a voice mail message, and store the voice mail message to a system voice mailbox accessible to multiple end units of the networked phone system.

6. The method of claim 3, wherein the functionality comprises serving recorded audio.

7. A hub device, comprising:
an interface for routing calls via a networked phone system; and
logic configured to:
receive a call specifying a target in the networked phone system;
identify a routing table entry in the hub device specifying a first networked telephone of a plurality of networked telephones as being associated with the target, wherein each networked telephone executes an instance of a distributed auto-attendant call system; and
route the call to the first networked telephone, wherein the instance of the distributed auto-attendant call system executing on the first end unit is configured to: (1) issue an external indication of the call via the first end unit upon determining that the target is a user number, and (2) handle the call without issuing an external indication of the call upon determining that the target is not a user number.

8. The hub device of claim 7, wherein the logic is further configured to forward the call to a second networked telephone of the networked phone system capable of handling the auto-attendant call in response to determining the first networked telephone is unavailable for handling the call.

9. The hub device of claim 7, wherein the logic is further configured to route auto-attendant calls to different networked telephones executing an instance of the auto-attendant call system via an algorithm designed to balance a load of auto-attendant calls between the different networked telephones.

10. A networked telephone system, comprising:
a network hub;
a plurality of end units capable of receiving calls routed over the network hub; and
a call distributor application configured to:
receive a call specifying a target in the networked phone system; and
identify a routing table entry specifying a first end unit of the plurality of end units as being associated with the target, wherein each of the plurality of end units comprises a networked telephone executing an instance of a distributed auto-attendant call system;
route the call to the first end unit, wherein the instance of the distributed auto-attendant call system executing on the first end unit is configured to: (1) issue an external indication of the call via the first end unit upon determining that the target is a user number, and (2) handle the call without issuing an external indication of the call upon determining that the target is not a user number.

11. The system of claim 10, wherein each of the end units comprises:
an interface for receiving calls routed via the network hub;
an executable instance of the distributed auto-attendant application; and
logic configured to receive a call via the interface.

12. The system of claim 11, wherein the first networked telephone is further configured to receive, from the call distributor application, configuration information comprising an identifying number to associate with the auto-attendant application.

13. The system of claim 12, wherein the call distributor application is further configured to:
select at least one end unit of the plurality of end units executing an instance of the distributed auto-attendant application via an algorithm designed to balance a load of auto-attendant calls between the plurality of end units; and
route an auto-attendant call to the selected at least one end unit.

14. The system of claim 13, wherein the call distributor is application further configured to forward an auto-attendant call to a second end unit executing an instance of the distributed auto-attendant application in response to detecting unavailability of a first end unit executing an instance of the distributed auto-attendant application.

15. The system of claim 14, wherein the configuration information also comprises another identifying number to associate with user voice calls, wherein the telephone device is configured to receive, via the interface, configuration information comprising an identifying number to associate with the auto-attendant application.

16. The system of claim 14, wherein the first networked telephone is further configured to register identifying numbers with the call distributor application during a registration process, wherein the call distributor application is not aware of a type of the auto-attendant calls prior to routing the auto-attendant calls.

* * * * *